United States Patent
Rofougaran (10) Patent No.: US 7,941,113 B2
(45) Date of Patent: May 10, 2011

(54) WIDE BANDWIDTH TRANSCEIVER

(75) Inventor: Ahmadreza (Reza) Rofougaran, Newport Coast, CA (US)

(73) Assignee: Broadcom Corporation, Irvine, CA (US)

( * ) Notice: Subject to any disclaimer, the term of this patent is extended or adjusted under 35 U.S.C. 154(b) by 276 days.

(21) Appl. No.: 12/128,767

(22) Filed: May 29, 2008

(65) Prior Publication Data
US 2008/0233998 A1 Sep. 25, 2008

Related U.S. Application Data

(63) Continuation of application No. 10/306,047, filed on Nov. 27, 2002, now Pat. No. 7,120,405.

(51) Int. Cl.
*H04B 1/18* (2006.01)
*H03D 5/00* (2006.01)

(52) U.S. Cl. .............. 455/168.1; 455/142; 455/133; 455/150.1; 455/552.1

(58) Field of Classification Search .......... 455/168.1, 455/142, 133, 150.1, 552.1, 78, 75, 41.2, 455/73
See application file for complete search history.

(56) References Cited

U.S. PATENT DOCUMENTS
| | | | | |
|---|---|---|---|---|
| 5,983,088 A | * | 11/1999 | Aschwanden | 455/188.2 |
| 6,021,164 A | * | 2/2000 | Park | 375/344 |
| 6,850,745 B2 | * | 2/2005 | Anand et al. | 455/260 |
| 7,120,405 B2 | * | 10/2006 | Rofougaran | 455/168.1 |

* cited by examiner

*Primary Examiner* — Eugene Yun
(74) *Attorney, Agent, or Firm* — Garlick Harrison & Markison; Bruce E. Garlick (57) ABSTRACT

The wide bandwidth transceiver includes a receiver section, a transmitter section, and a local oscillation module. The local oscillation module generates a first and a second local oscillation. The transmitter section converts an outbound baseband signal and/or a low intermediate frequency (IF) signal into a first outbound radio frequency (RF) signal based on the second local oscillation when the wide bandwidth transceiver is in a second wireless standard mode and converts the outbound baseband and/or the low IF signal into a second outbound RF signal based on the first and second local oscillations when the wide bandwidth transceiver is in a first wireless standard mode. The receiver section converts a first inbound RF signal into an inbound low IF signal and/or a baseband signal based on the first and second local oscillations when the wide bandwidth transceiver is in the first wireless standard mode and converts a second inbound RF signal into the inbound low IF signal and/or the baseband signal based on the second local oscillation when the wide bandwidth transceiver is in the second wireless standard mode.

5 Claims, 7 Drawing Sheets

FIG. 3
receiver section 72

FIG. 4
transmitter section 82

FIG. 5
receiver section 72

FIG. 6
transmitter section 82

FIG. 7
local oscillation module 74

WIDE BANDWIDTH TRANSCEIVER

This patent application is claiming priority under 35 USC §120 as a continuing patent application of co-pending patent application entitled WIDE BANDWIDTH TRANSCEIVER, having a filing date of Aug. 16, 2006, and a Ser. No. 11/504,911, which is a continuing patent application of issued patent entitled WIDE BANDWIDTH TRANSCEIVER, having a filing date of Nov. 27, 2002, a U.S. Pat. No. 7,120,405, and a Ser. No. 10/306,047.

BACKGROUND OF THE INVENTION

1. Technical Field of the Invention

This invention relates generally to wireless communication systems and more particularly to transceivers used within such wireless communication systems.

2. Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the receiver is coupled to the antenna and includes a low noise amplifier, one or more intermediate frequency stages, a filtering stage, and a data recovery stage. The low noise amplifier receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

As is also known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

As is further known, the many standards that govern wireless communication systems provide different operating frequency ranges. For example, IEEE802.11a operates in the 5.25 gigahertz and 5.75 gigahertz frequency ranges, IEEE802.11b and Bluetooth operate in the 2.4 gigahertz frequency range, and GSM operates in the 900 megahertz frequency range. Accordingly, the analog transmitter and receiver portions (e.g., the portions of a radio that convert between analog baseband signals and RF signals) are implemented differently for each different frequency range of the various standards. As such, if the analog transmitter and receiver portions are to be implemented on an integrated circuit, an integrated circuit manufacturer needs to produce separate integrated circuits for each different standard. Integrated circuit manufacturers are acutely aware of the added costs of developing, manufacturing, and supporting multiple integrated circuits of related technology.

Therefore, a need exists for a wide bandwidth transceiver that operates over a wide range of frequencies such that a single transceiver may support multiple wireless communication standards.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

DETAILED DESCRIPTION OF THE INVENTION

Figure 1:
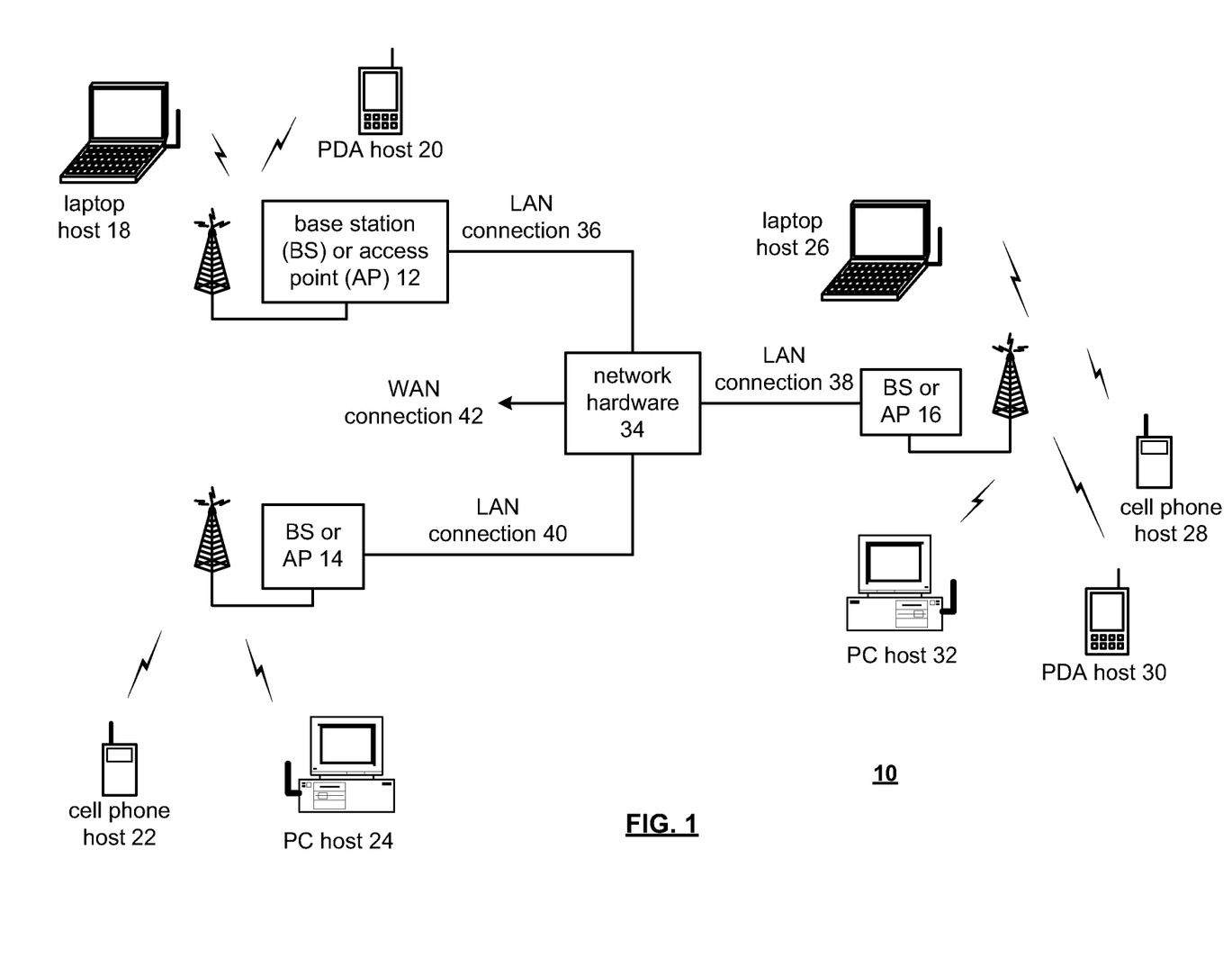
FIG. 1 is a schematic block diagram of a wireless communication system in accordance with the present invention.

FIG. 1 is a schematic block diagram illustrating a communication system 10 that includes a plurality of base stations and/or access points 12-16, a plurality of wireless communication devices 18-32 and a network hardware component 34. The wireless communication devices 18-32 may be laptop host computers 18 and 26, personal digital assistant hosts 20 and 30, personal computer hosts 24 and 32 and/or cellular telephone hosts 22 and 28. The details of the wireless communication devices will be described in greater detail with reference to FIG. 2.

The base stations or access points 12-16 are operably coupled to the network hardware 34 via local area network connections 36, 38 and 40. The network hardware 34, which may be a router, switch, bridge, modem, system controller, et cetera provides a wide area network connection 42 for the communication system 10. Each of the base stations or access points 12-16 has an associated antenna or antenna array to communicate with the wireless communication devices in its area. Typically, the wireless communication devices register with a particular base station or access point 12-14 to receive services from the communication system 10. For direct connections (i.e., point-to-point communications), wireless communication devices communicate directly via an allocated channel.

Typically, base stations are used for cellular telephone systems and like-type systems, while access points are used for in-home or in-building wireless networks. Regardless of the particular type of communication system, each wireless communication device includes a built-in radio and/or is coupled to a radio. The radio includes a highly linear amplifier and/or programmable multi-stage amplifier as disclosed herein to enhance performance, reduce costs, reduce size, and/or enhance broadband applications.

Figure 2:
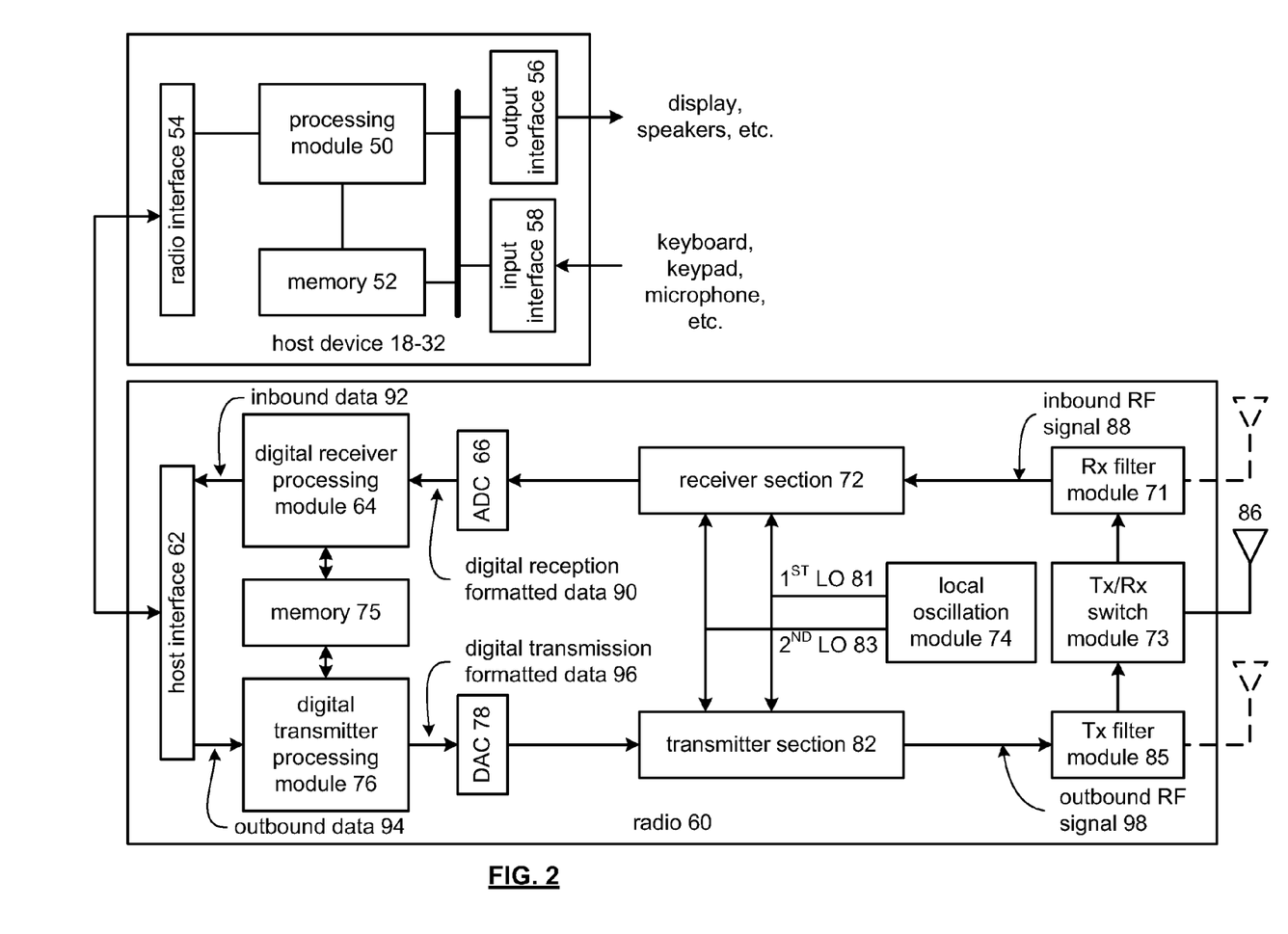
FIG. 2 is a schematic block diagram of a wireless communication device in accordance with the present invention.

FIG. 2 is a schematic block diagram illustrating a wireless communication device that includes the host device 18-32 and an associated radio 60. For cellular telephone hosts, the radio 60 is a built-in component. For personal digital assistants hosts, laptop hosts, and/or personal computer hosts, the radio 60 may be built-in or an externally coupled component.

As illustrated, the host device 18-32 includes a processing module 50, memory 52, radio interface 54, input interface 58 and output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output display device such as a display, monitor, speakers, et cetera such that the received data may be displayed. The radio interface 54 also provides data from the processing module 50 to the radio 60. The processing module 50 may receive the outbound data from an input device such as a keyboard, keypad, microphone, et cetera via the input interface 58 or generate the data itself. For data received via the input interface 58, the processing module 50 may perform a corresponding host function on the data and/or route it to the radio 60 via the radio interface 54.

Radio 60 includes a host interface 62, digital receiver processing module 64, an analog-to-digital converter 66, a receiver section 72, a receiver filter module 71, a transmitter/receiver switch 73, a local oscillation module 74, memory 75, a digital transmitter processing module 76, a digital-to-analog converter 78, a transmitter section 82, a transmitter filter module 85, and an antenna 86. The antenna 86 may be a single antenna that is shared by the transmit and receive paths as regulated by the Tx/Rx switch 73, or may include separate antennas for the transmit path and receive path. The antenna implementation will depend on the particular standard to which the wireless communication device is compliant.

The digital receiver processing module 64 and the digital transmitter processing module 76, in combination with operational instructions stored in memory 75, execute digital receiver functions and digital transmitter functions, respectively. The digital receiver functions include, but are not limited to, digital intermediate frequency to baseband conversion, demodulation, constellation demapping, decoding, and/or descrambling. The digital transmitter functions include, but are not limited to, scrambling, encoding, constellation mapping, modulation, and/or digital baseband to IF conversion. The digital receiver and transmitter processing modules 64 and 76 may be implemented using a shared processing device, individual processing devices, or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 75 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 64 and/or 76 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 94 from the host device via the host interface 62. The host interface 62 routes the outbound data 94 to the digital transmitter processing module 76, which processes the outbound data 94 in accordance with a particular wireless communication standard (e.g., IEEE 802.11a, IEEE 802.11b, Bluetooth, et cetera) to produce digital transmission formatted data 96. The digital transmission formatted data 96 will be a digital base-band signal or a digital low IF signal, where the low IF typically will be in the frequency range of one hundred kilohertz to a few megahertz.

The digital-to-analog converter 78 converts the digital transmission formatted data 96 from the digital domain to the analog domain. The transmitter section 82 converts the analog baseband or low IF signal into an outbound RF signal 98 based on a first and/or second local oscillation 81 and/or 83 provided by local oscillation module 74. The transmitter filter module 85, which may be a high frequency bandpass filter, filters the outbound RF signal 98 and provides the filtered RF signal to the Tx/Rx switch module 73 for subsequent transmission by the antenna 86 to a targeted device such as a base station, an access point and/or another wireless communication device.

The radio 60 also receives an inbound RF signal 88 via the antenna 86, which may have been transmitted by a base station, an access point, or another wireless communication device. The antenna 86 provides the inbound RF signal 88 to the receiver filter module 71 via the Tx/Rx switch 73, where the Rx filter 71, which may be a high frequency bandpass filter, filters the inbound RF signal 88. The Rx filter 71 provides the filtered RF signal to receiver section 72, which converts the amplified inbound RF signal into an inbound low IF signal or baseband signal based on the first and/or second oscillation 81 and/or 83 provided by local oscillation module 74. The receiver section 72 provides the inbound low IF signal or baseband signal to the ADC 66.

The analog-to-digital converter 66 converts the filtered inbound low IF signal from the analog domain to the digital domain to produce digital reception formatted data 90. The digital receiver processing module 64 decodes, descrambles, demaps, and/or demodulates the digital reception formatted data 90 to recapture inbound data 92 in accordance with the particular wireless communication standard being implemented by radio 60. The host interface 62 provides the recaptured inbound data 92 to the host device 18-32 via the radio interface 54.

As one of average skill in the art will appreciate, the wireless communication device of FIG. 2 may be implemented using one or more integrated circuits. For example, the host device may be implemented on one integrated circuit, the digital receiver processing module 64, the digital transmitter processing module 76 and memory 75 may be implemented on a second integrated circuit, and the remaining components of the radio 60, less the antenna 86, may be implemented on a third integrated circuit. As an alternate example, the radio 60 may be implemented on a single integrated circuit. As yet another example, the processing module 50 of the host device and the digital receiver and transmitter processing modules 64 and 76 may be a common processing device implemented on a single integrated circuit. Further, the memory 52 and memory 75 may be implemented on a single integrated circuit and/or on the same integrated circuit as the common processing modules of processing module 50 and the digital receiver and transmitter processing module 64 and 76.

Figure 3:
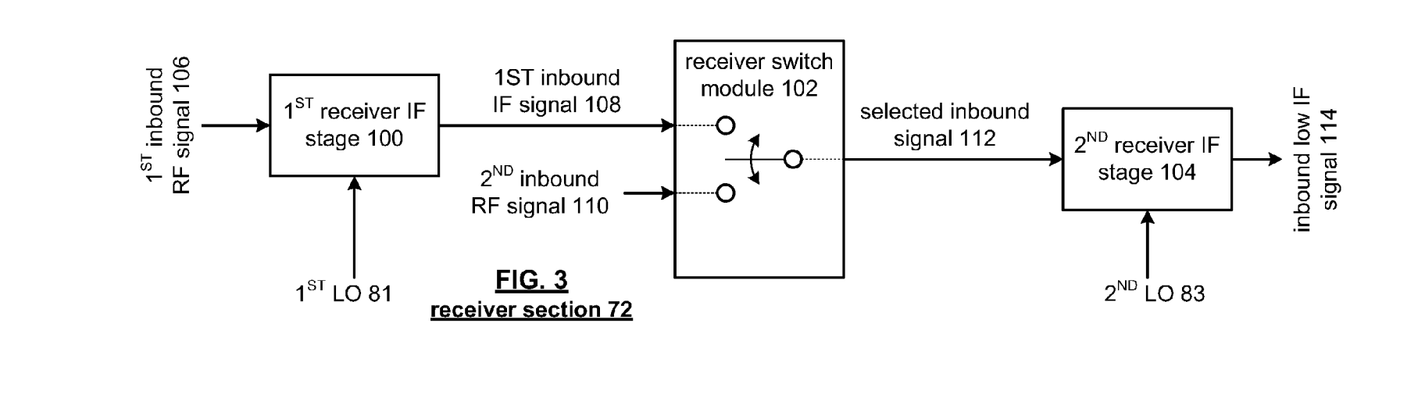
FIG. 3 is a schematic block diagram of a receiver section in accordance with the present invention.

FIG. 3 is a schematic block diagram of receiver section 72 that may be configured in one of two modes. As shown, the receiver section 72 includes a $1^{st}$ receiver intermediate frequency (IF) stage 100, a receiver switch module 102, and a $2^{nd}$ receiver IF stage 104. In a $1^{st}$ configuration of the receiver section 72, the receiver section 72 receives a $1^{st}$ inbound RF signal 106 via the $1^{st}$ receiver IF stage 100. The $1^{st}$ receiver IF stage 100 converts the $1^{st}$ inbound RF signal 106 into a $1^{st}$ inbound IF signal 108 based on the $1^{st}$ local oscillation 81. For example, if the $1^{st}$ inbound RF signal 106 corresponds to an IEEE802.11a signal, which has a carrier frequency of 5.25 gigahertz, the $1^{st}$ local oscillation 81 may have a frequency of 2.85 gigahertz. Accordingly, the $1^{st}$ inbound IF signal 108 has a carrier frequency of 2.4 gigahertz (e.g., 5.25 GHz–2.85 GHz). For this example, the frequency of the first local oscillation was selected such that the resulting $1^{st}$ inbound IF signal has a carrier frequency of 2.4 GHz, which substantially equals the carrier frequency of Bluetooth based signals and/or IEEE 802.11b signals. Accordingly, for this example, the receiver section 72 may be configured to process IEEE 802.11a signals or Bluetooth/IEEE 802.11b signals.

As an alternative example, the $1^{st}$ local oscillation 81 may have a frequency of 4.35 gigahertz such that the $1^{st}$ inbound IF signal 108 has a carrier frequency of 900 megahertz. In this example, the receiver section 72 would be configurable to process $1^{st}$ inbound RF signal 106 that are compliant with IEEE 802.11a, which has a carrier frequency of 5.25 gigahertz, or configured to process $2^{nd}$ inbound RF signals 110 that are compliant with GSM, which has a carrier frequency of 900 megahertz.

As yet another alternate example, the $1^{st}$ local oscillation 81 may have a frequency of 1.5 gigahertz and the $1^{st}$ inbound RF signal 106 may have a carrier frequency of 2.4 gigahertz in accordance with 802.11b and/or Bluetooth. The resulting $1^{st}$ inbound IF signal has a carrier frequency of 900 megahertz. According to this example, the receiver section 72 may be configured to process $1^{st}$ inbound RF signals 106 that are compliant with 802.11b and/or Bluetooth or configured to process $2^{nd}$ inbound RF signals 110 that are compliant with GSM or other standard that utilizes 900 megahertz transmissions.

Continuing with the $1^{st}$ configuration of the receiver section 72, the receiver switch module 102, which may be a high frequency multiplexor, switching network, and/or tri-state input buffering network, couples the $1^{st}$ inbound IF signal 108 to the $2^{nd}$ receiver IF stage 104. The $2^{nd}$ receiver IF stage 104 converts the $1^{st}$ inbound IF signal 108 into an inbound low IF signal 114 based on the $2^{nd}$ local oscillation 83. The inbound low IF signal 114 may have a carrier frequency in the range from baseband to a few megahertz. Continuing with the preceding examples, if the $1^{st}$ inbound RF signal 106 has a carrier frequency of 5.25 gigahertz, the $1^{st}$ local oscillation 81 has a frequency of 2.85 gigahertz such that the $1^{st}$ inbound IF signal has a carrier frequency of 2.4 gigahertz, the $2^{nd}$ local oscillation 83 may have a frequency of approximately 2.4 gigahertz such that the resulting inbound low IF signal has a zero to a few megahertz carrier frequency. In the $2^{nd}$ example, if the $1^{st}$ inbound RF signal has a 5.25 gigahertz carrier frequency and the $1^{st}$ local oscillation 81 has a frequency of 4.35 gigahertz such that the $1^{st}$ inbound IF signal 108 has a carrier frequency of 900 megahertz, the $2^{nd}$ local oscillation 83 may have a frequency of approximately 900 megahertz. In the $3^{rd}$ example, if the $1^{st}$ inbound RF signal 106 has a carrier frequency of 2.4 gigahertz, the $1^{st}$ local oscillation 81 may have a frequency of 1.5 gigahertz such that the $1^{st}$ inbound IF signal 108 has a carrier frequency of 900 megahertz and the $2^{nd}$ local oscillation 83 will have a frequency of 900 megahertz.

In a $2^{nd}$ configuration of receiver section 72, the receiver is coupled to receive the $2^{nd}$ inbound RF signal 110. In this configuration, the receiver switch module 102 passes the $2^{nd}$ inbound RF signal 110 to the $2^{nd}$ receiver IF stage 104. The $2^{nd}$ receiver IF stage 104 converts the $2^{nd}$ inbound RF signal 110 into the inbound low IF signal 114 based on the $2^{nd}$ local oscillation 83. In this configuration, the $1^{st}$ receiver IF stage 100 and the $1^{st}$ local oscillation 81 may be disabled.

In general, for a dual mode receiver in accordance with the present invention, the $2^{nd}$ inbound RF signal 110 corresponds to the mode having the lower carrier frequency, which for the preceding examples was either 2.4 gigahertz (GHz) or 900 megahertz and the $1^{st}$ inbound RF signal 106 corresponds to the mode having the higher carrier frequency, which for the preceding examples was either 5.25 GHz or 2.4 GHz.

Figure 4:
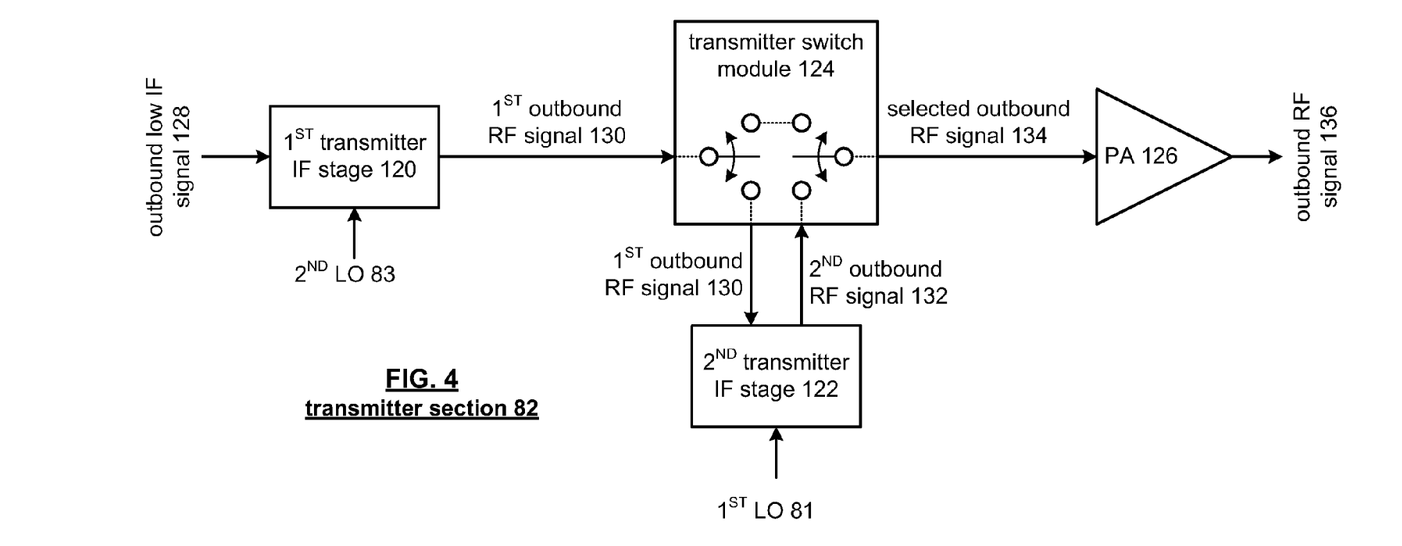
FIG. 4 is a schematic block diagram of a transmitter section in accordance with the present invention.

FIG. 4 is a schematic block diagram of transmitter section 82 that can be configured in one of two modes. The transmitter section 82 includes a $1^{st}$ transmitter IF stage 120, a transmitter switch module 124, a $2^{nd}$ transmitter IF stage 122, and a power amplifier 126. In a $1^{st}$ mode, the transmitter section is operably coupled to convert an outbound low IF signal 128, which has a carrier frequency in the range of baseband to a few megahertz, into an outbound RF signal 136 having a specified carrier frequency. For example, the outbound RF signal 136 may have a carrier frequency of 900 megahertz, 2.4 megahertz, or 5.25 megahertz. If the transmitter section 82 is to convert the low IF signal 128 into an output RF signal 136 having a 5.25 gigahertz carrier frequency, the transmitter switch module 124 is configured such that the outbound low IF signal 128 is up converted by both the 1$^{st}$ and 2$^{nd}$ transmitter IF stages 120 and 122. As one of average skill in the art will appreciate, the configuration of the transmitter section 82 corresponds to the configuration of the receiver section 72. As such, if the receiver section is configured to receive 5.25 gigahertz carrier frequency signals, the transmitter section is configured to output radio frequency signals having a carrier frequency of 5.25 gigahertz.

In a 1$^{st}$ configuration of the transmitter section 82, the transmitter switch module 124, which may be a multiplexer, high frequency switching network, or tri-state buffering network, provides the 1$^{st}$ outbound RF signal 130 to the 2$^{nd}$ transmitter IF stage 122 and provides the output of the 2$^{nd}$ transmitter IF stage 122 to the power amplifier 126. In a 2$^{nd}$ configuration of the transmitter section 82, the transmitter switch module 124 bypasses the 2$^{nd}$ transmitter IF stage 122 and passes the 1$^{st}$ outbound RF signal 130 to the power amplifier 126. Similarly to the receiver section 72, the transmitter section 82 may have multiple configurations to provide multiple modes of operation.

As with the examples provided for the receiver section 72, the transmitter section 82 may have a dual mode of up converting low IF signals to 900 megahertz and 2.4 gigahertz, to 2.4 gigahertz and 5.25 gigahertz, or to 900 megahertz and 5.25 gigahertz. For instance, if the transmitter section 82 is to up convert the outbound low IF signal 128 to 2.4 GHz or to 5.25 GHz, the first local oscillation would be 2.85 GHz and the second local oscillation would be 2.4 GHz. Thus, in the first mode, the 1$^{st}$ transmitter IF stage 120 up-converts the outbound low IF signal into the 1$^{st}$ outbound RF signal 130 having a carrier frequency of 2.4 GHz. The transmitter switching module 124 provides the 1$^{st}$ outbound RF signal 130 to the 2$^{nd}$ transmitter IF stage 122. The 2$^{nd}$ transmitter IF stage 122 up-converts the 1$^{st}$ outbound RF signal 130 to the 2$^{nd}$ outbound RF signal 132 based on the 1$^{st}$ local oscillation 81, which has a frequency of 2.85 GHz. As such, the 2$^{nd}$ outbound RF signal 132 has a carrier frequency of 5.35 GHz. In the 2$^{nd}$ configuration, the transmitter switch module 124 passes the 1$^{st}$ outbound RF signal 130 to the power amplifier 126. In this mode, the resulting outbound RF signal 136 has a carrier frequency of 2.4 GHz.

Figure 5:
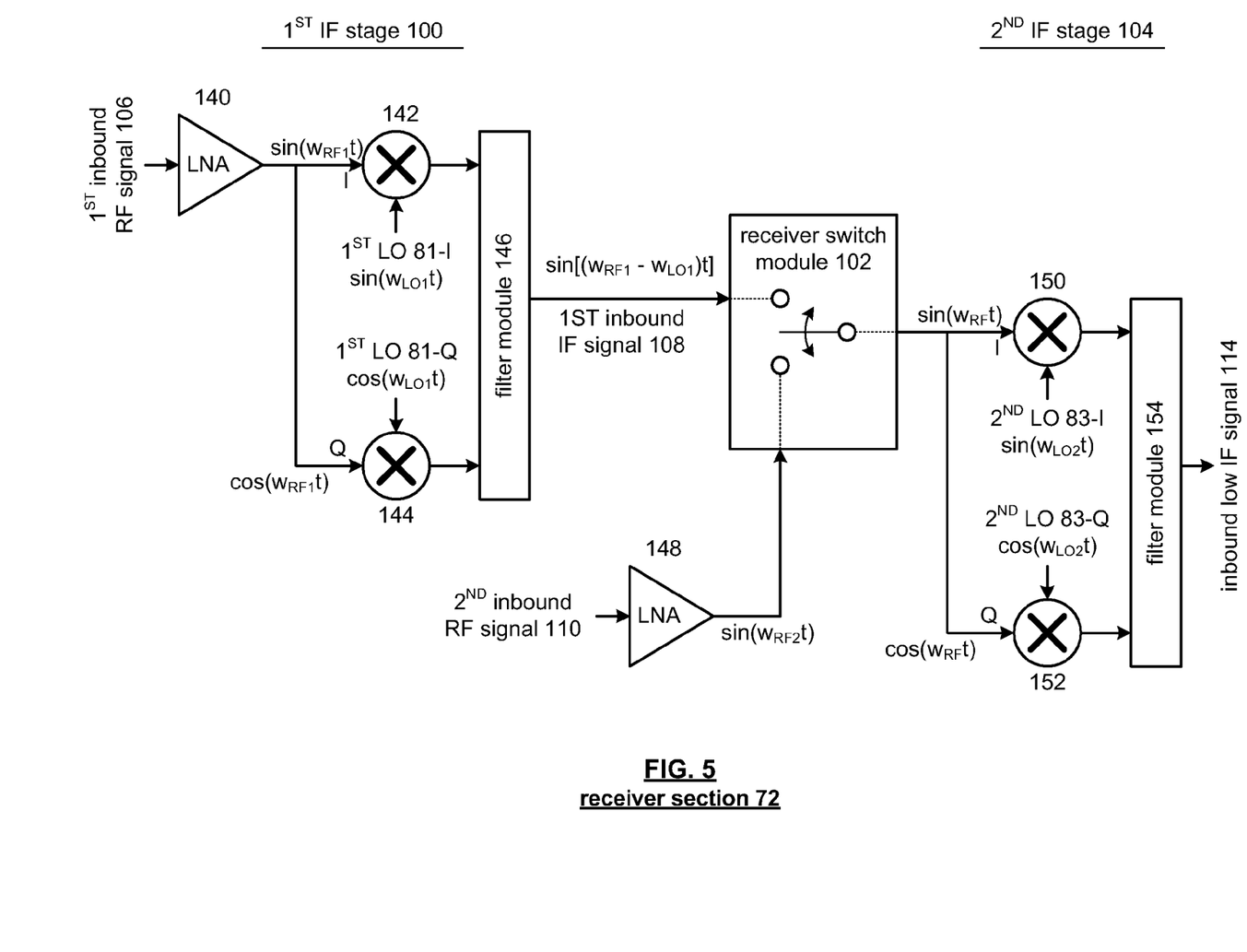
FIG. 5 is a schematic block diagram of an alternate receiver section in accordance with the present invention.

FIG. 5 is a schematic block diagram of an alternate receiver section 72. The receiver section 72 includes the 1$^{st}$ IF stage 100, the receiver switch module 102, and the 2$^{nd}$ IF stage 104. The 1$^{st}$ IF stage 100 includes a low noise amplifier 140, 1$^{st}$ and 2$^{nd}$ mixers 142 and 144, and a filter module 146. The 2$^{nd}$ IF stage 104 includes 1$^{st}$ and 2$^{nd}$ mixers 150 and 152 and filter module 154. The receiver section 72 also includes a low noise amplifier 148.

In a first mode of the receiver section 72, the 1$^{st}$ IF stage 100 receives the 1$^{st}$ inbound IF signal 106 and amplifies it via the low noise amplifier 140. The low noise amplifier 140 outputs an in-phase component and a quadrature component of the RF signal 106. The in-phase component (I), which may be represented by $\sin(\omega_{RF1}t)$, is mixed via mixer 142 with an in-phase component of the 1$^{st}$ local oscillation 81, which may be represented by $\sin(\omega_{LO1}t)$. The 2$^{nd}$ mixer 144 mixes the quadrature component (Q) of the RF signal, which may be represented by $\cos(\omega_{RF1}t)$, with the quadrature component of the 1$^{st}$ local oscillation 81, which may be represented by $\cos(\omega_{LO1}t)$. The resulting mixed signals are then filtered by filter module 146, which may be a bandpass filter, to produce the 1$^{st}$ inbound IF signal 108, which may be represented by $\sin[(\omega_{RF1}-\omega_{LO1})t]$.

The receiver switch module 102 provides the 1$^{st}$ inbound IF signal 108 to the 2$^{nd}$ IF stage 104. The 1$^{st}$ mixer 150 of the 2$^{nd}$ IF stage 104 mixes the in-phase component, e.g., $\sin(\omega_{RF}t)$, of the 1$^{st}$ inbound IF signal 108 with the in-phase component, e.g., $\sin(\omega_{LO2}t)$, of the 2$^{nd}$ local oscillation 83-I to produce a first mixed signal. Note that, for this mode, $\omega_{RF}$ equals $\omega_{RF1}-\omega_{LO1}$. The 2$^{nd}$ mixer 152 of the 2$^{nd}$ IF stage 104 mixes the quadrature component of the 1$^{st}$ inbound IF signal 108, e.g., $\cos(\omega_{RF}t)$, with the in-phase component of the 2$^{nd}$ local oscillation i.e., $\cos(\omega_{LO2}t)$, to produce a second mixed signal. The first and second mixed signals are filtered via filter module 154, which may be a bandpass filter, to produce the inbound low IF signal 114, e.g., $\sin(\omega_0 t)=\sin[(\omega_{RF}-\omega_{LO2})t]$.

In a second mode of the receiver section 72, the receiver section 72 receives the 2$^{nd}$ inbound RF signal 110, e.g., $\sin(\omega_{RF2}t)$, via the low noise amplifier 148. In this mode, the receiver switch module 102 passes the output of low noise amplifier 148 to the mixers 150 and 152 of the 2$^{nd}$ IF stage 104. The 1$^{st}$ mixer 150 mixes the in-phase component, e.g., $\sin(\omega_{RF}t)$, of the 2$^{nd}$ inbound RF signal 110 with the in-phase component, e.g., $\sin(\omega_{LO2}t)$, of the 2$^{nd}$ local oscillation 83-I to produce a first mixed signal. Note that, for this mode, $\omega_{RF}$ equals $\omega_{RF2}$. The 2$^{nd}$ mixer 152 mixes the quadrature component of the 2$^{nd}$ inbound RF signal 110, e.g., $\cos(\omega_{RF}t)$, with the in-phase component of the 2$^{nd}$ local oscillation i.e., $\cos(\omega_{LO2}t)$, to produce a second mixed signal. The first and second mixed signals are filtered via filter module 154 to produce the inbound low IF signal 114, e.g., $\sin(\omega_0 t)=\sin[(\omega_{RF}-\omega_{LO2})t]$.

Figure 6:
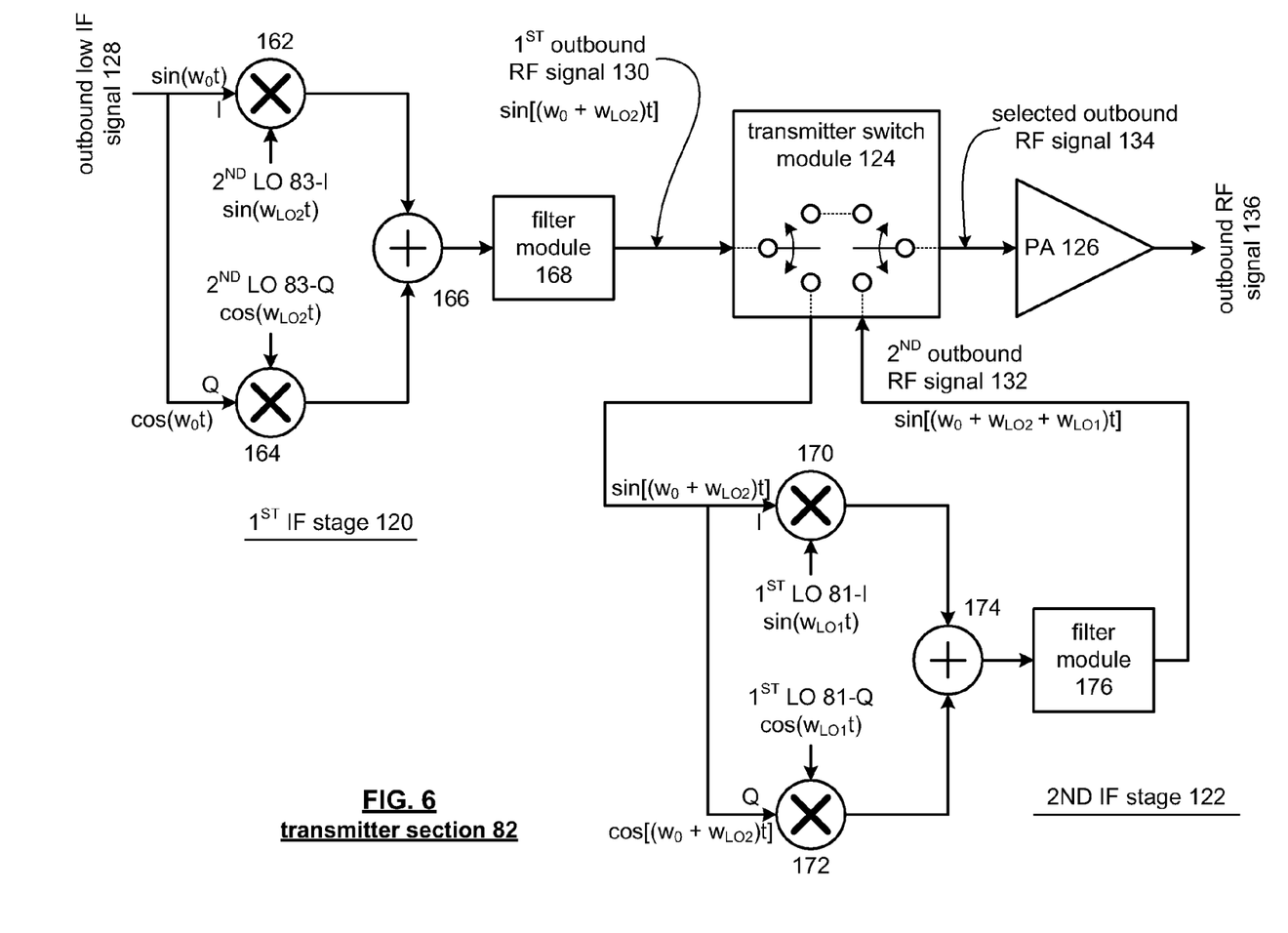
FIG. 6 is a schematic block diagram of an alternate transmitter section in accordance with the present invention.

FIG. 6 is a schematic block diagram of an alternate transmitter section 82 that includes the 1$^{st}$ IF stage 120, the transmitter switch 124, the 2$^{nd}$ IF stage 122 and the power amplifier 126. In this embodiment, the 1$^{st}$ IF stage 120 includes 1$^{st}$ and 2$^{nd}$ mixers 162 and 164, a summation module 166, and a filter module 168. The 2$^{nd}$ IF stage 122 includes 1$^{st}$ and 2$^{nd}$ mixers 172, summation module 174 and filter module 176. When the transmitter section 82 is configured to up convert the outbound low IF signal 128 to the higher frequency range mode of operation, the transmitter switch module 124 couples the output of the 1$^{st}$ IF stage 120 to the 2$^{nd}$ IF stage 122 such that the outbound low IF signal 128 is up converted by the 1$^{st}$ and 2$^{nd}$ IF stages 120 and 122. The 1$^{st}$ IF stage 120 up converts the outbound low IF signal 128 by mixing the in-phase component thereof, e.g., $\sin(\omega_0 t)$, with the in-phase component of the 2$^{nd}$ local oscillation 83, e.g., $\sin(\omega_{LO2}t)$ and by mixing the quadrature component thereof, e.g., $\cos(\omega_0 t)$, with the quadrature component of the 2$^{nd}$ local oscillation 83, e.g., $\cos(\omega_{LO2}t)$. The resulting mixed signals are summed via summation module 166 and then filtered via filter module 168. The filter module 168, which may be a bandpass filter, outputs the 1$^{st}$ outbound RF signal 130, which may be represented by $\sin[(\Omega_0+\omega_{LO2})t]$.

The transmit switch module 124 provides the 1$^{st}$ outbound RF signal 130 to the 2$^{nd}$ IF stage 122. Mixing module 170 mixes the in-phase component of the 1$^{st}$ outbound RF signal 130, e.g., $\sin[(\omega_0+\omega_{LO2})t]$, with the in-phase component of the 1$^{st}$ local oscillation 81, e.g., $\sin(\omega_{LO1}t)$. Mixing module 172 mixes the quadrature component of the 1$^{st}$ outbound RF signal 130, e.g., $\cos[(\omega_0+\omega_{LO2})t]$, with the quadrature component of the 1$^{st}$ local oscillation 81, e.g., $\cos(\omega_{LO1}t)$. The resulting mixed signals are summed via summation module and filtered via filter module 176. The filter module 176, which may be a bandpass filter, outputs the $2^{nd}$ outbound RF signal 132, which may be represented by sin $[(\omega_0+\omega_{LO2}+\omega_{LO1})t]$.

The transmit switch module 124 then provides the $2^{nd}$ outbound RF signal 132, as the selected outbound RF signal 134, to power amplifier 126, which produces the outbound RF signal 136.

In the alternate configuration, the transmitter section 82 up converts the outbound low IF signal 128 to the lower of the two frequency range modes. In this instance, the transmitter switch 124 bypasses the $2^{nd}$ IF stage 122 and provides the $1^{st}$ outbound RF signal 130 to the power amplifier 126. The power amplifier 126 then produces the outbound RF signal 136 from the $1^{st}$ outbound RF signal 130.

Figure 7:
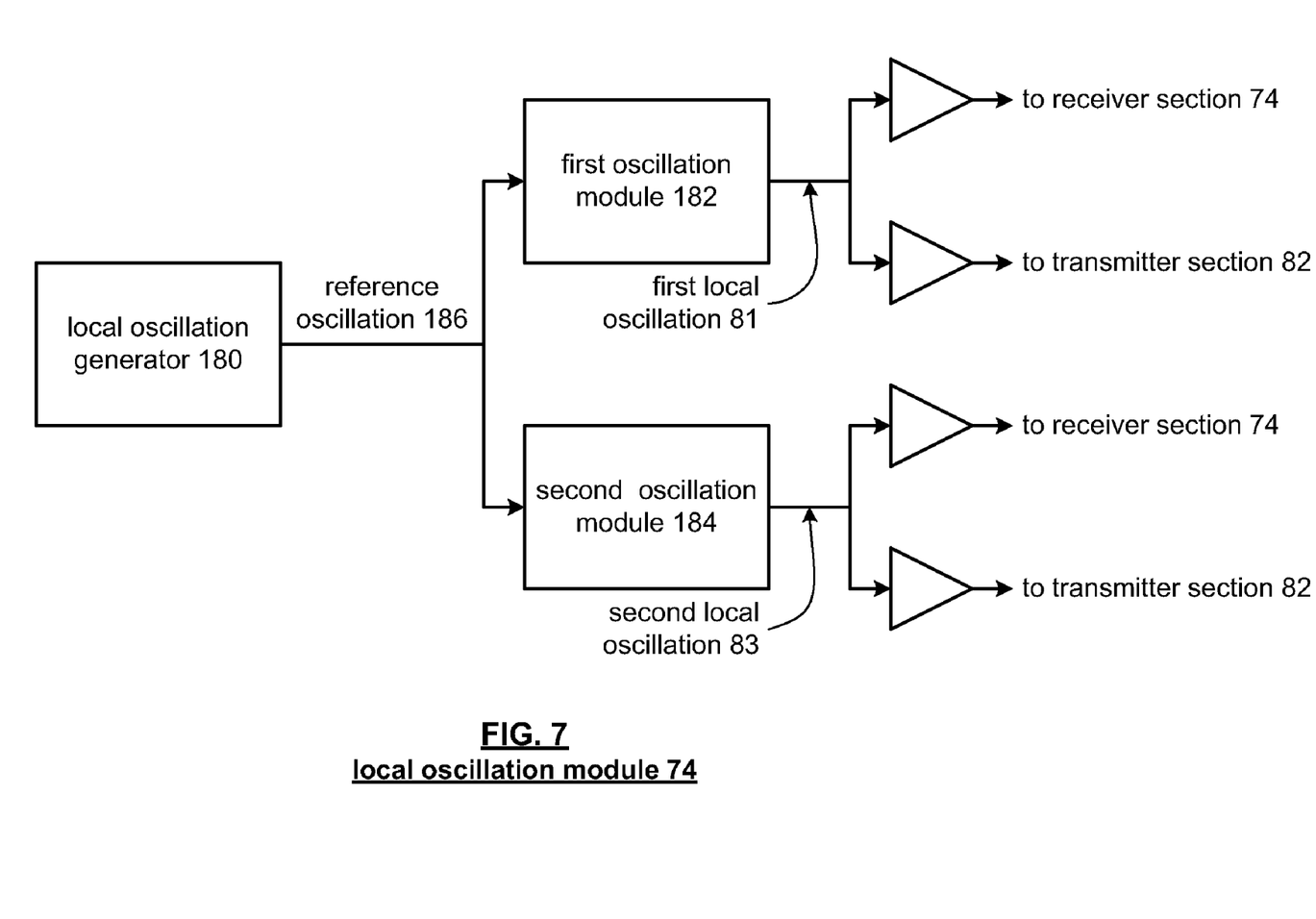
FIG. 7 is a schematic block diagram of a local oscillation module in accordance with the present invention.

FIG. 7 is a schematic block diagram of a local oscillation module 74 that includes a local oscillation generator 180, $1^{st}$ oscillation module 182 and $2^{nd}$ oscillation module 184. The local oscillation generator 180 produces a reference oscillation 186. The $1^{st}$ oscillation module 182 manipulates the reference oscillation 186 to produce the $1^{st}$ local oscillation 81. The $1^{st}$ local oscillation 81 may be buffered and provided to the receiver section 72 and separately to the transmitter section 82. Similarly, the $2^{nd}$ oscillation module 184 manipulates the reference oscillation 186 to produce the $2^{nd}$ local oscillation 83. The $2^{nd}$ local oscillation 83 may be buffered and separately provided to the receiver section 72 and transmitter section 82.

In one embodiment of the local oscillation module 74, the local oscillation generator 180 is a crystal oscillator that produces a reference oscillation 186. The $1^{st}$ and $2^{nd}$ oscillation modules 182 and 184 may be separate phase locked loops that produce the $1^{st}$ local oscillation 81 and $2^{nd}$ local oscillation 83, respectively. For example, the crystal generator may generate a clock signal of approximately 20 megahertz while the $1^{st}$ local oscillation 81 may be 2.85 gigahertz and the $2^{nd}$ local oscillation may be 2.4 gigahertz.

In a $2^{nd}$ embodiment of the local oscillation module 74, the local oscillation generator 180, the $1^{st}$ oscillation module 182 and the $2^{nd}$ oscillation module 184 may each be phase locked loops producing their respective oscillations. In a $3^{rd}$ embodiment of the local oscillation module 74, the local oscillation generator 180 may be a phase locked loop that produces a reference oscillation 186 at a frequency similar to the frequency of the $1^{st}$ local oscillation 81. The $2^{nd}$ oscillation module 184 may be a phase locked loop or frequency adjust module to produce the $2^{nd}$ local oscillation 83 from the reference oscillation 186 or from the $1^{st}$ local oscillation 81. In this example, the $1^{st}$ oscillation module 182 may be an additional buffer, or frequency adjust module.

Figure 8:
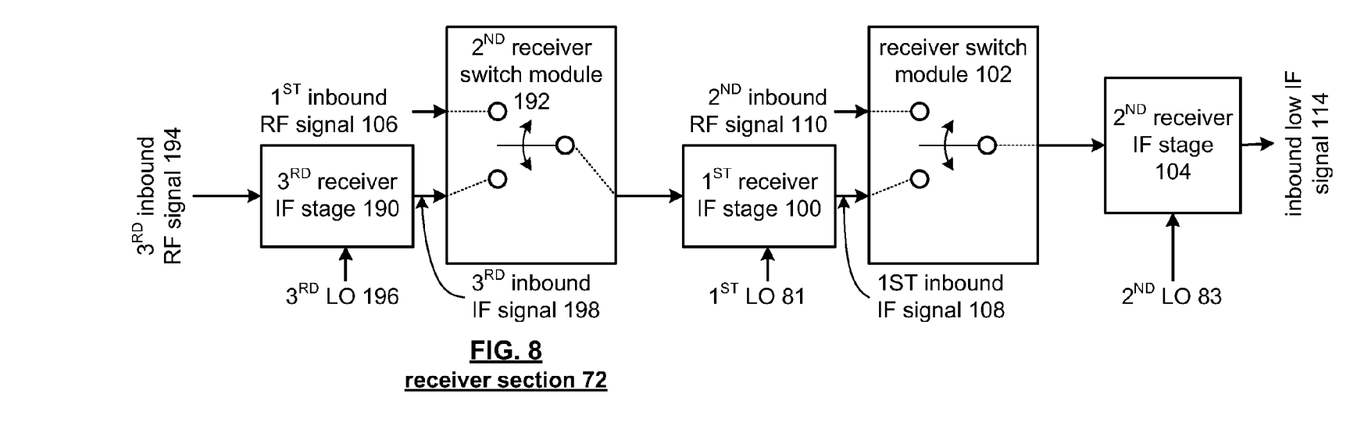
FIG. 8 is a schematic block diagram of another embodiment of a receiver section in accordance with the present invention.

FIG. 8 is a schematic block diagram of an alternate embodiment of receiver section 72. In this embodiment, the receiver section 72 may be configured in one of three modes. For example, the receiver section 72 may be configured to receive $3^{rd}$ inbound RF signals 194, $1^{st}$ inbound RF signals 106 or $2^{nd}$ inbound RF signals 110. In one example, the $3^{rd}$ inbound RF signals 194 have a carrier frequency of 5.25 gigahertz, the $1^{st}$ inbound RF signals 106 have a carrier frequency of 2.4 gigahertz and the $2^{nd}$ inbound RF signals 110 have a carrier frequency of 900 megahertz.

When the receiver section 72 is configured to process the $2^{nd}$ inbound RF signals 110, which for example may have a carrier frequency of 900 megahertz, the $2^{nd}$ receiver switch module 192, the $1^{st}$ receiver IF stage 100 and the $3^{rd}$ receiver IF stage 190 may be disabled. Accordingly, the receiver switch module 102 provides the $2^{nd}$ inbound RF signals 110 to the $2^{nd}$ receiver IF stage 104. The $2^{nd}$ receiver IF stage 104 converts the $2^{nd}$ inbound RF signals 110 into the inbound low IF signals 114 based on the $2^{nd}$ local oscillation 83. For example, if the $2^{nd}$ inbound RF signal 110 has a carrier frequency of 900 megahertz, the $2^{nd}$ local oscillation 83 has a frequency of 900 megahertz such that the inbound low IF signal 114 has a carrier frequency of zero to a few megahertz.

When the receiver section 72 is configured to receive $1^{st}$ inbound RF signals 106, which may have a carrier frequency of 2.4 gigahertz, the $3^{rd}$ receiver IF stage 190 may be deactivated. In this mode, the $2^{nd}$ receiver switch module 192 provides the $1^{st}$ inbound RF signals 106 to the $1^{st}$ receiver IF stage 100. The $1^{st}$ receiver IF stage 100 converts the $1^{st}$ inbound RF signals 106 into $1^{st}$ inbound IF signals 108 based on the $1^{st}$ local oscillation 81, which may have a frequency of 1.5 gigahertz. The receiver switch module 102 passes the $1^{st}$ inbound IF signals 108 to the $2^{nd}$ receiver IF stage 104. The $2^{nd}$ receiver IF stage 104 converts the $1^{st}$ inbound IF signal 108 into the inbound low IF signal based on the $2^{nd}$ local oscillation 83, which may have a frequency of 900 megahertz.

In a $3^{rd}$ configuration, the receiver section 72 is operably coupled to receive the $3^{rd}$ inbound RF signals 194. The $3^{rd}$ receiver IF stage 190 converts the $3^{rd}$ inbound RF signals 194 into $3^{rd}$ inbound IF signals 198 based on a $3^{rd}$ local oscillation 196. The $3^{rd}$ local oscillation 196 may have a frequency of 2.85 gigahertz when the $3^{rd}$ inbound RF signals 194 have a carrier frequency of 5.25 gigahertz. The $2^{nd}$ switch module 192 provides the $3^{rd}$ inbound IF signals 198 to the $1^{st}$ receiver IF stage 100. The $1^{st}$ receiver IF stage 100 converts the $3^{rd}$ inbound IF signals 198 into the $1^{st}$ inbound IF signals 100 based on the $1^{st}$ local oscillation 81, which may have a frequency of 1.5 gigahertz.

The receiver switch module 102 provides the $1^{st}$ inbound IF signals 108 to the $2^{nd}$ IF stage 104. The $2^{nd}$ receiver IF stage 104 converts the $1^{st}$ inbound IF signal 108 into the inbound low IF signal 114 based on the $2^{nd}$ local oscillation 83 which may have a frequency of 900 megahertz.

Figure 9:
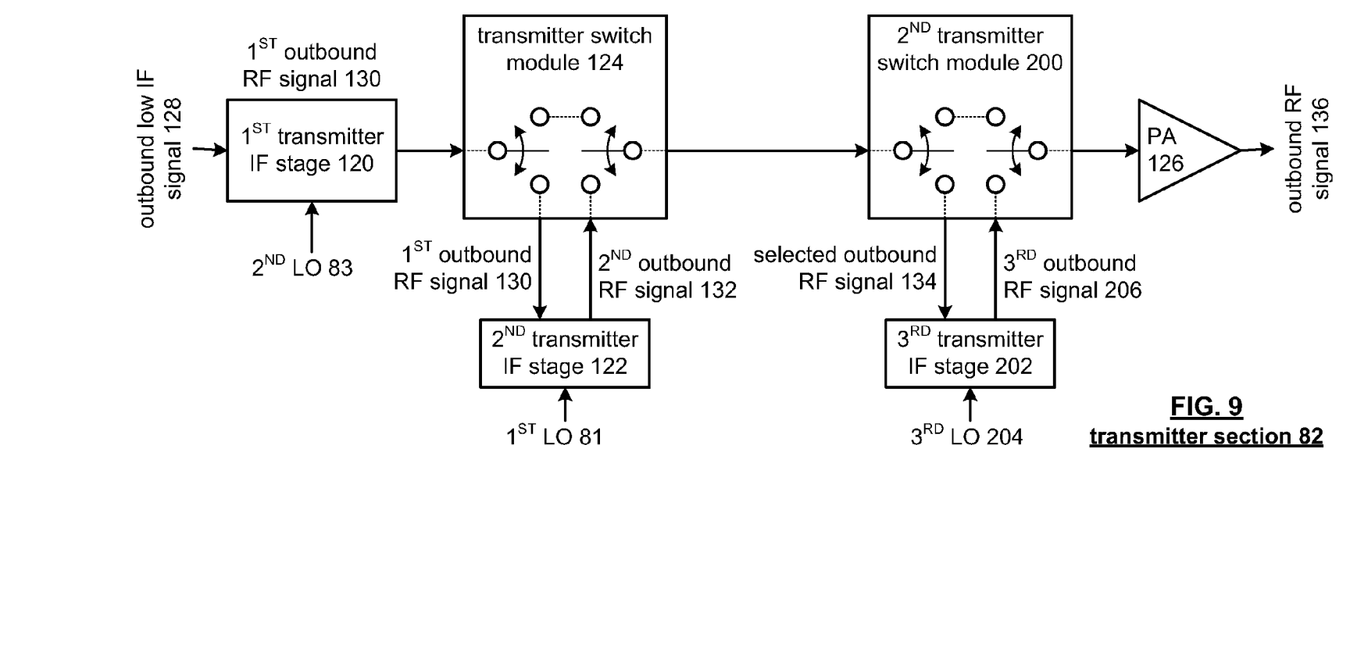
FIG. 9 is a schematic block diagram of another embodiment of a transmitter section in accordance with the present invention.

FIG. 9 is a schematic block diagram of another embodiment of transmitter section 82 that includes the $1^{st}$ transmitter IF stage 120, the $2^{nd}$ transmitter IF stage 122, the transmitter switch module 124, a $2^{nd}$ transmitter switch module 200, a $3^{rd}$ transmitter IF stage 202 and the power amplifier 126. As illustrated, the transmitter section 82 may be configured to up convert the outbound low IF signal 128 to an output RF signal 136 having a $1^{st}$, $2^{nd}$ or $3^{rd}$ carrier frequency. For example, the $1^{st}$ carrier frequency may correspond to 900 megahertz, the $2^{nd}$ carrier frequency to 2.4 gigahertz and the $3^{rd}$ carrier frequency to 5.25 gigahertz.

When the transmitter section 82 is configured to up convert the outbound low IF signal 128 to the outbound RF signal 136 having a carrier frequency of 900 megahertz, the $2^{nd}$ local oscillation 83 has a frequency of 900 megahertz. Accordingly, the $1^{st}$ transmitter IF stage 120 up converts the outbound low IF signal 128 to the $1^{st}$ outbound RF signal 130 having a carrier frequency of 900 megahertz. The transmitter switch module 124 and $2^{nd}$ transmitter switch module 200 are configured to pass the $1^{st}$ outbound RF signal 130 to the power amplifier 126.

In a $2^{nd}$ configuration, the transmitter section 82 may be configured to up convert the outbound low IF signal 128 to the outbound RF signal 136 having a carrier frequency of 2.4 gigahertz. In this configuration, the $1^{st}$ transmitter IF stage 120 produces the $1^{st}$ outbound RF signal 130 having a carrier frequency of 900 megahertz. Transmitter switch module 124 provides the $1^{st}$ outbound RF signal 130 to the $2^{nd}$ transmitter IF stage 122. The $2^{nd}$ transmitter IF stage 122 up converts the $1^{st}$ outbound RF signal 130 to the $2^{nd}$ outbound RF signal 132 having a carrier frequency of 2.4 gigahertz based on the $1^{st}$ local oscillation 81 having a frequency of 1.5 gigahertz. The $2^{nd}$ transmitter switch module 200 is configured to pass the $2^{nd}$ outbound RF signal 132 to the power amplifier.

In the $3^{rd}$ configuration, where the transmitter section 82 is configured to convert the outbound low IF signal 128 into the outbound RF signal 136 having a carrier frequency of 5.25 gigahertz, the $1^{st}$ transmitter IF stage 120, transmitter switch 124 and $2^{nd}$ transmitter IF stage 122 are active to produce the $2^{nd}$ outbound RF signal 132 having a carrier frequency of 2.4 gigahertz.

The $2^{nd}$ transmitter switch module 200, in this configuration, provides the $2^{nd}$ outbound RF signal 132 to the $3^{rd}$ transmitter IF stage 202. The $3^{rd}$ transmitter IF stage 202 up converts the $2^{nd}$ outbound RF signal 132 based on the $3^{rd}$ local oscillation 204, which may have a frequency of 2.85 gigahertz, to produce the $3^{rd}$ outbound RF signal 206. The $2^{nd}$ transmitter switch module 200 provides the $3^{rd}$ outbound RF signal 206 to the power amplifier 126, which outputs the outbound RF signal 136 having a carrier frequency of 5.25 gigahertz.

The preceding discussion has presented a wide bandwidth transceiver that is capable of supporting multiple wireless communication standards. As one of average skill in the art will appreciate, other embodiments may be derived from the teaching of the present invention, without deviating from the scope of the claims.

What is claimed is:

1. A radio frequency integrated circuit (RFIC) comprises:
a local oscillation module coupled to generate at least one of a first local oscillation and a second local oscillation;
a transmitter section coupled to convert an outbound baseband signal into a first outbound radio frequency (RF) signal based on the second local oscillation when the wide bandwidth transceiver is in a second wireless standard mode and coupled to convert the outbound baseband into a second outbound RF signal based on the first and second local oscillations when the wide bandwidth transceiver is in a first wireless standard mode;
a receiver section coupled to convert a first inbound RF signal into an inbound baseband signal based on the first and second local oscillations when the wide bandwidth transceiver is in the first wireless standard mode and coupled to convert a second inbound RF signal into the inbound baseband signal based on the second local oscillation when the wide bandwidth transceiver is in the second wireless standard mode; and
a baseband module coupled to convert outbound data into the outbound baseband signal and to convert the inbound baseband signal into inbound data.

2. The RFIC of claim 1 comprises:
the first wireless standard mode including at least one of: IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and variations thereof; and
the second wireless standard mode including at least one of: IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and variations thereof.

3. The RFIC of claim 1 comprises:
the local oscillation module coupled to generate a third local oscillation;
the transmitter section coupled to convert the outbound baseband signal into a third outbound RF signal based on the first, second, and third local oscillations when the wide bandwidth transceiver is in a third wireless standard mode;
the receiver section coupled to convert a third inbound RF signal into the inbound baseband signal based on the first, second, and third local oscillation when the wide bandwidth transceiver is in the third wireless standard mode.

4. The RFIC of claim 1, wherein the receiver section comprises:
a first low noise amplifier coupled to amplify the first inbound RF signal to produce an amplified first inbound RF signal;
a second low noise amplifier coupled to amplify the second inbound RF signal to produce an amplified second inbound RF signal;
a first receiver IF stage, when enabled, converts the amplified first inbound RF signal into a first inbound IF signal based on the first local oscillation;
receiver switching module coupled to pass one of the first inbound IF signal and the second inbound RF signal to produce a selected inbound signal; and
second receiver IF stage coupled to convert the selected inbound signal into the at least one of the inbound low IF signal and the baseband signal based on the second location oscillation.

5. The RFIC of claim 1, wherein transmitter section comprises:
a first transmitter IF stage coupled to convert the at least one of the outbound baseband and a low IF signal into the first outbound RF signal based on the second local oscillation;
a second transmitter IF stage, when enabled, converts the first outbound RF signal into the second outbound RF signal based on the first location oscillation;
a power amplifier operably coupled to amplifier a selected outbound RF signal; and
a transmitter switching module operably coupled to provide one of the first outbound RF signal and the second outbound RF signal to the power amplifier as the selected outbound RF signal.

* * * * *

UNITED STATES PATENT AND TRADEMARK OFFICE
CERTIFICATE OF CORRECTION

| | | |
|---|---|---|
| PATENT NO. | : 7,941,113 B2 | Page 1 of 1 |
| APPLICATION NO. | : 12/128767 | |
| DATED | : May 10, 2011 | |
| INVENTOR(S) | : Ahmadreza (Reza) Rofougaran | |

It is certified that error appears in the above-identified patent and that said Letters Patent is hereby corrected as shown below:

Title Page, Item (63) should read: Continuation of application No. 11/504,911, filed on Aug. 16, 2006, now Pat. No. 7,542,747 which is a continuation of application No. 10/306,047, filed on Nov. 27, 2002, now Pat. No. 7,120,405.

Signed and Sealed this
Third Day of January, 2012

David J. Kappos
*Director of the United States Patent and Trademark Office*